United States Patent
Yahara

(10) Patent No.: US 6,532,313 B1
(45) Date of Patent: Mar. 11, 2003

(54) IMAGE RECORDING AND RETRIEVING SYSTEM USING INDEX INFORMATION OF A FILM

(75) Inventor: Masashi Yahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/289,661

(22) Filed: Apr. 12, 1999

(30) Foreign Application Priority Data

Apr. 15, 1998 (JP) .............................. 10-121785

(51) Int. Cl.⁷ .............................. G06K 9/54; H04N 1/00
(52) U.S. Cl. ........................ 382/305; 358/403
(58) Field of Search ................. 382/305, 306, 382/181; 358/296, 403, 444, 335; 355/23, 45, 202, 28; 707/1, 100, 200; 353/26 R

(56) References Cited

U.S. PATENT DOCUMENTS

| | | | | |
|---|---|---|---|---|
| 3,904,099 A | * | 9/1975 | Inoue .......................... 226/33 |
| 4,745,489 A | * | 5/1988 | Kashiwagi et al. .......... 358/296 |
| 4,786,980 A | * | 11/1988 | Sonobe et al. ............... 358/335 |
| 4,942,425 A | * | 7/1990 | Kamimura et al. ........... 355/45 |
| 4,972,068 A |  | 11/1990 | Ohtani et al. ................ 235/375 |
| 5,049,923 A | * | 9/1991 | Sakakibara ................... 355/45 |
| 5,065,182 A | * | 11/1991 | Fujita et al. ................. 355/202 |
| 5,137,347 A | * | 8/1992 | Imai .......................... 353/26 A |
| 5,208,627 A | * | 5/1993 | Yoshihara et al. ............. 355/23 |
| 5,383,029 A | * | 1/1995 | Kojima ........................ 358/403 |
| 5,758,939 A | * | 6/1998 | Ochiai et al. ................ 353/25 |
| 6,031,632 A | * | 2/2000 | Yoshihara et al. ........... 358/403 |

* cited by examiner

Primary Examiner—Jose L. Couso
Assistant Examiner—Kanji Patel
(74) Attorney, Agent, or Firm—Fitzpatrick, Cella, Harper & Scinto

(57) ABSTRACT

On the basis of index information fetched from an image photographing device upon photographing of a microfilm, image data fetched from the microfilm after the development is stored into a personal computer PC in association therewith. In this way, each time the microfilm is scanned by a microfilm image scanning device, an image filing with an index can be performed without adding an index.

6 Claims, 20 Drawing Sheets

| FILE | IMAGE ADDRESS | NUMBER OF PAGES |
|---|---|---|
| 1 | 121B | 1 |
| 2 | 121B1F | 4 |
| 3 | 121B2F | 3 |
| 4 | 121B3F | 5 |
| 5 | 121B4F | 2 |

OFFSET ADDRESS 120B

FIG. 13A
| FILE | RETRIEVAL ADDRESS | NUMBER OF PAGES | IMAGE ADDRESS |
|---|---|---|---|
| 1 | 1B | 1 | 121B |
| 2 | 1B1F | 4 | 121B1F |
| 3 | 1B2F | 3 | 121B2F |
| 4 | 1B3F | 5 | 121B3F |
| 5 | 1B4F | 2 | 121B4F |
FIG. 13B
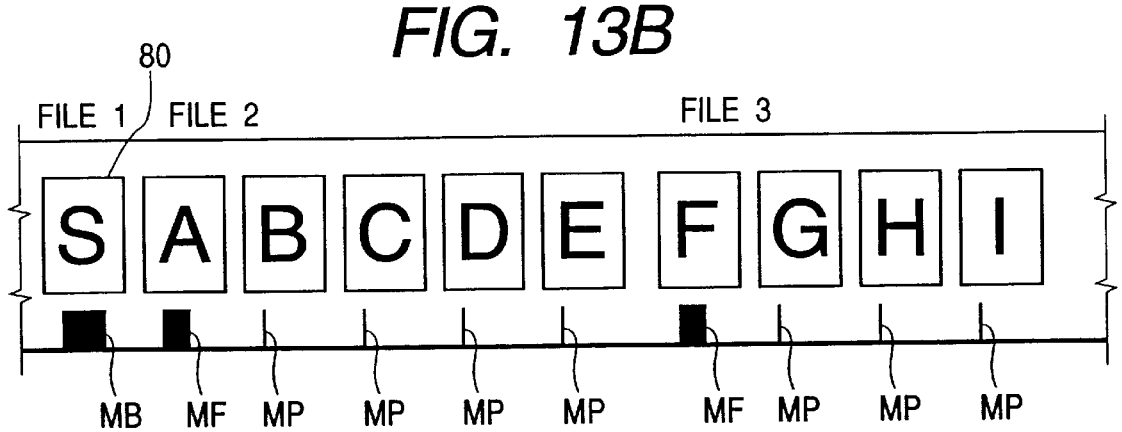
FIG. 13C
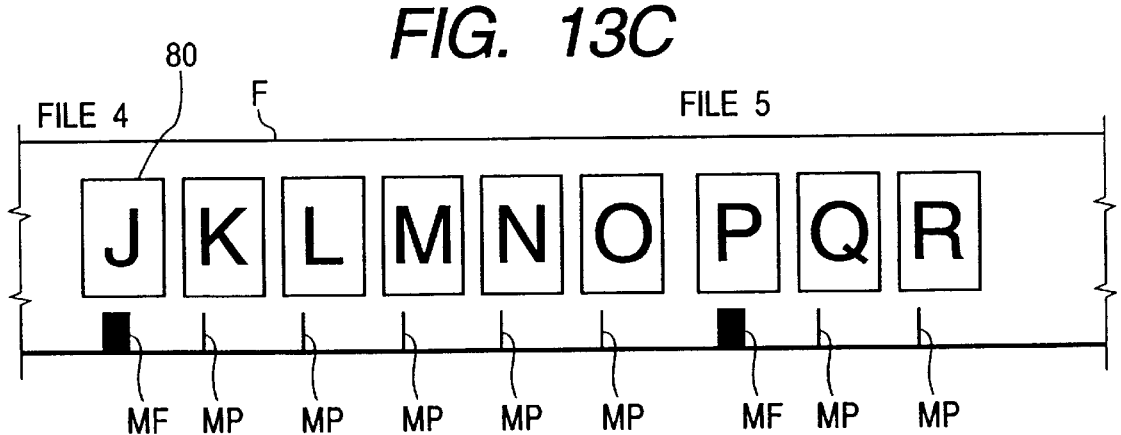

| FILE | RETRIEVAL ADDRESS | NUMBER OF PAGES | IMAGE |
|------|-------------------|-----------------|-------|
| 1 | 1B | 1 | S |
| 2 | 1B1F | 4 | A, B, C, D, E |
| 3 | 1B2F | 3 | F, G, H, I |
| 4 | 1B3F | 5 | J, K, L, M, N, O |
| 5 | 1B4F | 2 | P, Q, R |

OFFSET ADDRESS 120B

FIG. 15

| FILE | IMAGE ADDRESS | NUMBER OF PAGES | IMAGE |
|---|---|---|---|
| 1 | 121B | 1 | S |
| 2 | 121B1F | 4 | A, B, C, D, E |
| 3 | 121B2F | 3 | F, G, H, I |
| 4 | 121B3F | 5 | J, K, L, M, N, O |
| 5 | 121B4F | 2 | P, Q, R |

OFFSET ADDRESS 120B

FIG. 17A

| FILE | IMAGE ADDRESS | NUMBER OF PAGES | READ CODE |
|---|---|---|---|
| 1 | 121B | 1 | 10900 |
| 2 | 121B1F | 4 | 10543 |
| 3 | 121B2F | 3 | 10387 |
| 4 | 121B3F | 5 | 10684 |
| 5 | 121B4F | 2 | 10779 |

FIG. 17B

| FILE | RETRIEVAL ADDRESS | NUMBER OF PAGES | READ CODE |
|---|---|---|---|
| 1 | 1B | 1 | 10900 |
| 2 | 1B1F | 4 | 10543 |
| 3 | 1B2F | 3 | 10387 |
| 4 | 1B3F | 5 | 10684 |
| 5 | 1B4F | 2 | 10779 |

FIG. 17C

| FILE | READ CODE | NUMBER OF PAGES | REFERENCE ADDRESS | IMAGE |
|---|---|---|---|---|
| 1 | 10387 | 3 | 121B2F | F, G, H, I, |
| 2 | 10543 | 4 | 121B1F | A, B, C, D, E |
| 3 | 10684 | 5 | 121B3F | J, K, L, M, N, O |
| 4 | 10779 | 2 | 121B4F | P, Q, R |
| 5 | 10900 | 1 | 121B | S |

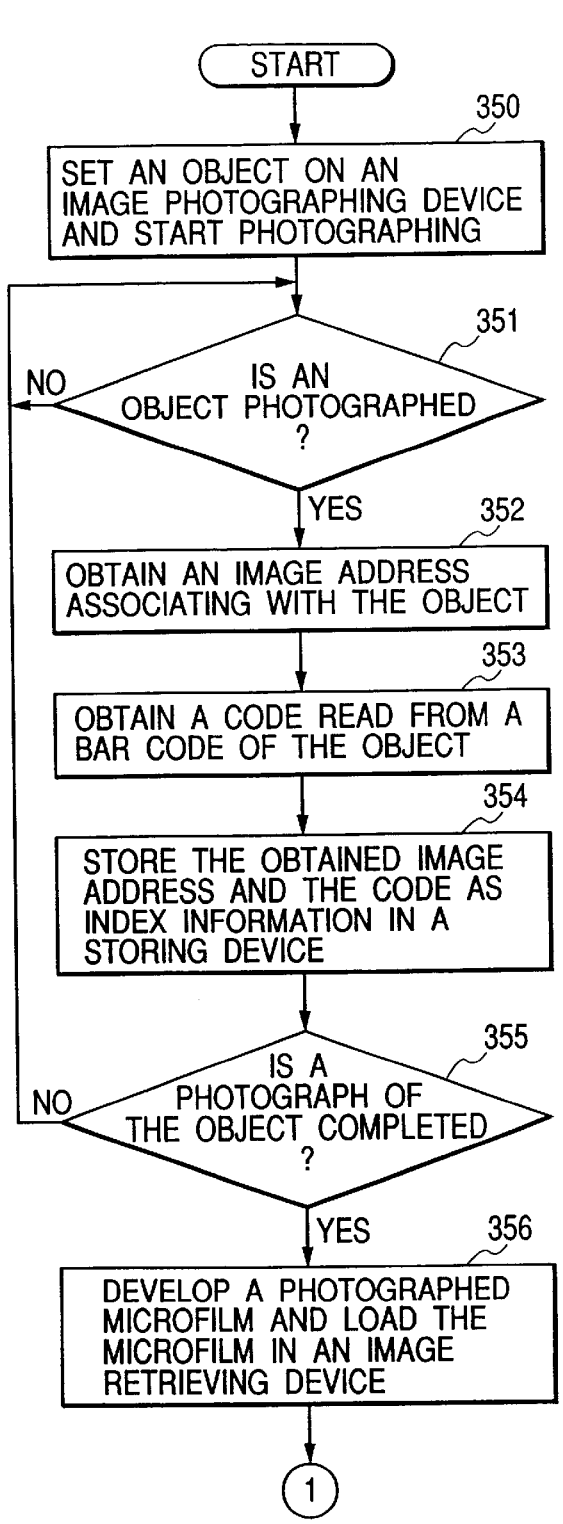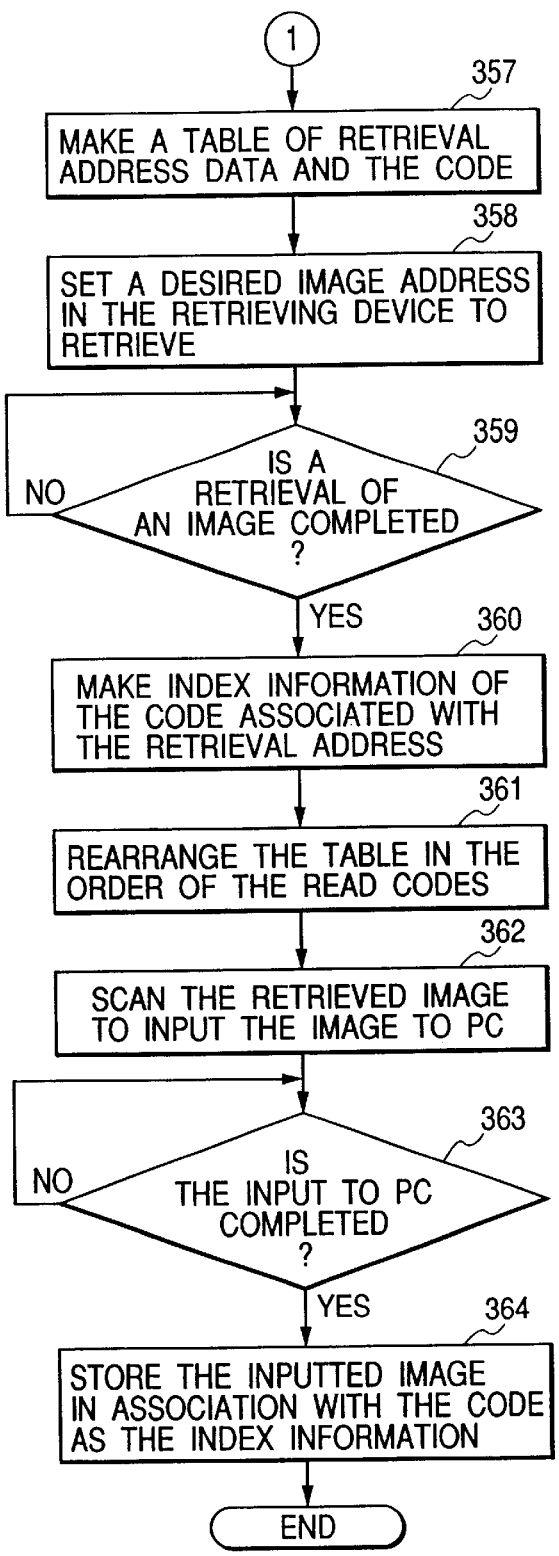
FIG. 18A
FIG. 18B

| FILE | READ CODE | NUMBER OF PAGES | REFERENCE ADDRESS | IMAGE |
|---|---|---|---|---|
| 1 | 10387 | 3 | 121B2F | × |
| 2 | 10543 | 4 | 121B1F | A, B, C, D, E |
| 3 | 10684 | 5 | 121B3F | × |
| 4 | 10779 | 2 | 121B4F | P, Q, R |
| 5 | 10900 | 1 | 121B | S | ns.md
IMAGE RECORDING AND RETRIEVING SYSTEM USING INDEX INFORMATION OF A FILM

BACKGROUND OF THE INVENTION

1. Field of the Invention

The invention relates to an image data filing system having: an image photographing device to sequentially photograph an image of an object by using, for example, a long microfilm; a microfilm retrieving device to retrieve the image of the microfilm photographed by the photographing device; and a microfilm image scanning device to electrically read the retrieved image of the microfilm and to use it as image data.

2. Related Background Art

Hitherto, such a kind of image data filing system has the following construction.

A rotary camera as an image photographing device is used to microphotograph an image of an object (original) such as a literature, drawing, draft, bill, check, stocks, or the like and to a microfilm or the like. The rotary camera continuously microphotographs an object while exposing through a slit and moving the object and the microfilm together synchronously with a reduction ratio, so that a rapid photographing of a large-number of images and a photographing of a long size can be performed.

That is, the object fed from a sheet feeding port is conveyed at a predetermined speed and passes through an exposing portion. In this instance, an image of the object illuminated by a lamp is formed onto a film surface by a lens via a plurality of mirror systems and a slit.

There is also a rotary camera having a function to simultaneously photograph a retrieval mark to be used for retrieval by a microfilm retrieving device in correspondence to an image to be photographed. A rotary camera constructed such that a retrieval mark is photographed and an image address of the image is automatically transmitted from the rotary camera to a computer has also been devised.

The image stored in the microfilm has an excellent proof ability (admissibility) because it can bear a preservation for a long time, high preservation performance is derived, a density is high, alteration is impossible, and the like. On the contrary, a developing process is necessary after the photographing and its handling is not easy.

A microfilm reader printer has been devised for purposes such that the microfilm image can be printed, a microfilm image scanning device optically reads the image of the microfilm and converts into image data of a digital signal and can electrically store, the reader printer is connected to a telephone line, and the image data can be stored into a storing device in the computer.

The microfilm image scanning device is used to convert the image of the microfilm which was optically projected into image data of an electric signal by using a photoelectric transferring element such as a CCD or the like and to send the signal to the outside after that.

The microfilm retrieving device has film conveying means for forwardly (normally) or reversely conveying an attached roll-shaped microfilm via a projecting position (film illuminating portion) between a take-up portion and a rewinding portion. Address information of a desired image frame portion (image information portion, microimage portion) which was previously inputted to a controlling portion by inputting means and should be retrieved is compared with mark detection information that is inputted to the controlling portion from mark detecting means for detecting a pre-added retrieval mark in correspondence to each image frame portion which has sequentially photographed along a longitudinal direction of the film in a forward or reverse conveying step of the film. On the basis of a comparison result, the film conveying means is automatically driven or stopped so that the desired image frame portion is retrieved and stopped at the projecting position.

Generally, the retrieval mark is photographed in a lower portion of the image photographed on a long microfilm in order to discriminate the position of each image. The microfilm retrieving device is a device such that the retrieval mark associated with the image is detected by mark detecting means and is counted, thereby retrieving a desired image.

The retrieval mark usually has three sizes of large, middle, and small. A file of the middle mark is constructed by a set of a plurality of small marks (page marks). A large mark (batch) is constructed by a set of a plurality of middle marks (file marks).

The microfilm image scanning device ordinarily has a reader screen. The image frame portion retrieved at the projecting position is enlargedly projected as an image onto a reader screen surface by a projection optical system on the device main body side such as a reader or the like, so that projected image can be viewed.

In this state, when a scanning instruction is sent to the microfilm image scanning device, the scanning function operates and the image of the microfilm read out by the photoelectric transferring element such as a CCD or the like is extracted as image data of the digital signal and stored in the storing device.

As mentioned above, the microfilm retrieving device and the microfilm image scanning device with the storing device automatically retrieve the individually photographed images and can sequentially feed them while scanning and storing. Therefore, they are also used as a microfilm image converting device for automatically and continuously converting a plurality of microfilm images into electric signals and storing into the storing device.

In a system comprising the image photographing device, microfilm image retrieving device, and microfilm image scanning device, a system for forming a database by using an image address upon photographing and retrieving and printing a desired image on the basis of the data in the database has been devised.

At this time, if the microfilm image scanning device is used, the image can be displayed on the screen of a computer or can be printed. Further, when image data is read out from the microfilm image scanning device and stored into the computer, if the image data is stored into the storing device of the computer, the stored electronized image can be used in a future retrieval.

However, even if the image data as an electronized image is stored in the computer, since no index is allocated to the image, the index to retrieve the electronized image has to be inputted each time the image data is stored. The operations to scan the microfilm image and store into the computer are very troublesome.

SUMMARY OF THE INVENTION

The invention is made to solve the problems of the conventional technique as mentioned above and it is an object of the invention to provide an image data filing system which doesn't need to input an index each time image data is stored.

To accomplish the above object, the invention comprises: photographing means for photographing an image of an original to a recording medium and allocating a retrieval mark based on index information of the image to the recording medium; retrieving means for retrieving the image by using the recording medium to which the image was photographed by the photographing means; and image data converting means for converting the image retrieved by the retrieving means into image data and storing into a storing medium, wherein when the converted image data is stored into the storing medium, the data converting means stores the image data to the storing medium in association with the index information.

Therefore, the index information which has previously been stored when the original is photographed can be constructed as a database and the image data can be stored and filed in association with the index information of the database. Thus, since an index of the image data filing is allocated by the index information formed upon photographing of the original, there is no need to input an index every image data to be stored.

It is also preferable to use an image address as index information.

Thus, the image data can be stored and filed by using the database of the image addresses.

The photographing means has code reading means for reading a code added to the original and it is also preferable to use code information of the code as index information.

Thus, a database is formed by the code information and the image data can be stored and filed in association with the code information.

It is also preferable to have discriminating means for discriminating whether the image retrieved by the retrieving means is the same as the image data which has already been stored in the storing medium or not on the basis of the index information associated to each image.

Thus, whether the image data is overlapped data or not can be discriminated before it is stored as image data.

It is also desirable that the storing medium stores discrimination information indicative of a result of the discrimination of whether the image is the same as the image data which has already been stored or not as one data item together with the image data.

Thus, by retrieving the image data, the presence or absence of the overlapped image data can be soon known.

When it is determined by the discriminating means that the image is the same as the image data which has already been stored, it is desirable that the image data converting means skips the image without converting into the image data.

Thus, in case of continuously storing the image data, a high storing speed can be realized.

BRIEF DESCRIPTION OF THE DRAWINGS

FIG. 13A is a table showing a table in which image addresses and retrieval addresses corresponding to each other according to the first embodiment;

FIGS. 13B and 13C are image diagrams showing microfilms which are used for retrieval;

FIG. 15 is a table showing a table to which the databases of FIGS. 12A and 14A are coupled;

FIG. 17A is a table showing a database of image addresses upon photographing and code information according to the second embodiment;

FIG. 17B is a table showing a database of retrieval addresses and the code information according to the second embodiment;

FIG. 17C is a table showing a database of the code information and image data according to the second embodiment;

FIGS. 18A and 18B are flowcharts showing an image data filing according to the second embodiment;

DETAILED DESCRIPTION OF THE PREFERRED EMBODIMENTS

Preferred embodiments of the present invention will now be described in detail hereinbelow with reference to the drawings. Dimensions, materials, shapes, a relative arrangement, and the like of component parts described in the embodiments are not limited and do not restrict the scope of the invention unless otherwise specified.

[First Embodiment]

Figure 1:
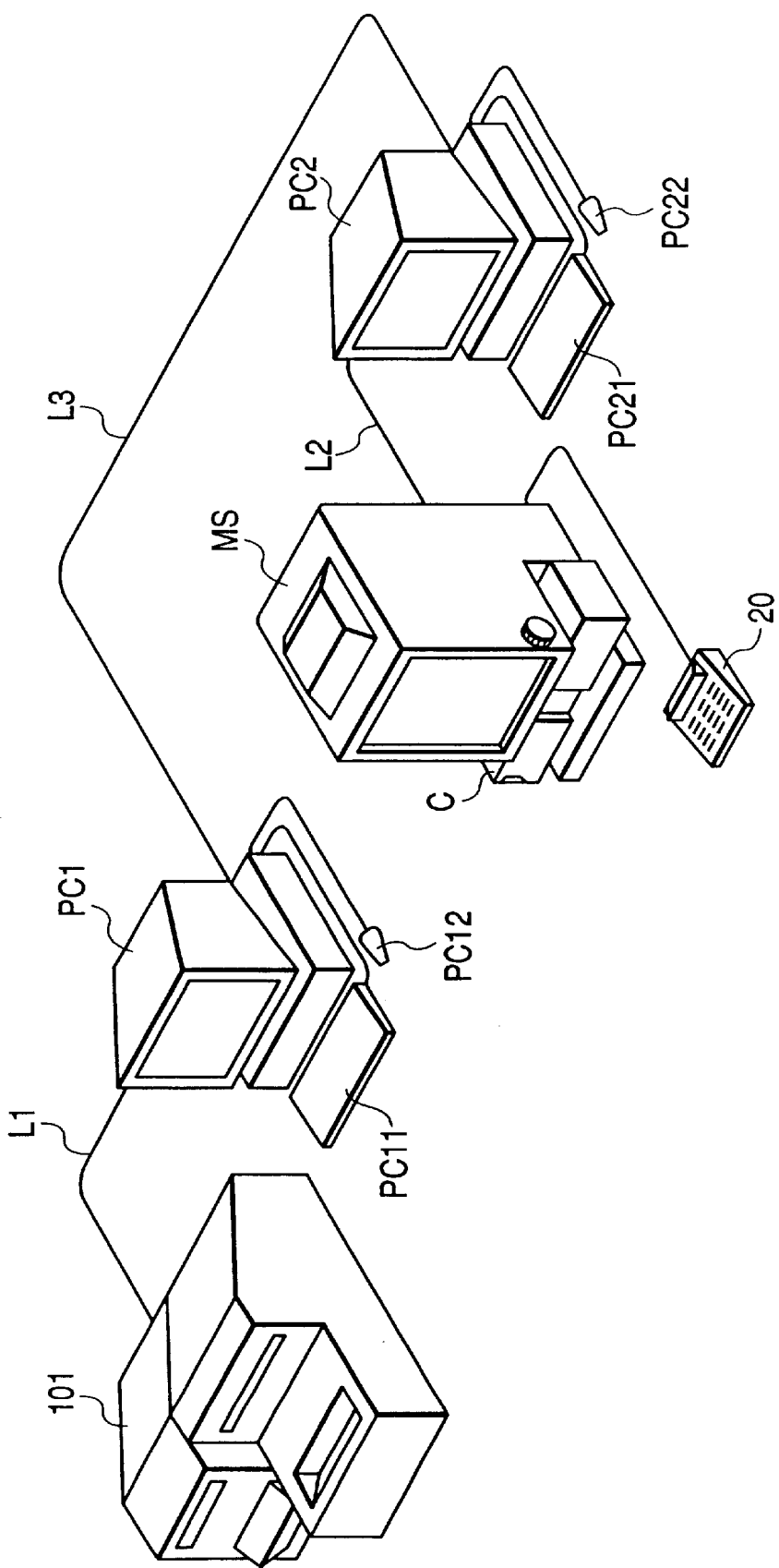
FIG. 1 is an external connection diagram showing an image filing system according to the first embodiment in which an image photographing device, a microfilm retrieving device, and a microfilm image scanning device are connected to a personal computer.

FIG. 1 is an external connection diagram of an image filing system of the invention.

An image photographing device 101 serving as photographing means conveys an object (original) to be photographed and photographs it onto a roll-shaped microfilm. A microfilm image scanning device MS serving as image data converting means is a device to convert image information on the microfilm into an electric signal by an image pickup element. A microfilm retrieving device C serving as retrieving means is a device to retrieve the microfilm on the basis of a retrieval mark or the like added to an image on the roll-shaped microfilm serving as a storing medium.

Each of personal computers PC1 and PC2 serving as storing means is a device having: a microcomputer for controlling the system; an internal memory comprising a RAM, a ROM, or the like; an external memory comprising a floppy disk, a cartridge disk, or the like; and external communicating means such as a network or the like. Each of the personal computers can perform an exchange of information to/from external connection equipment, a rearrangement of information, and the like. PC11 and PC21 denote keyboards of the personal computers and PC12 and PC22 indicate mouses.

The image photographing device 101 is connected to the personal computer PC1 by a cable L1 which can communicate images, image address information as retrieval information, equipment control information, or the like. Image address information of images photographed by the image photographing device 101 is sent to the personal computer PC1 via the cable L1.

In the personal computer PC1, the transmitted image address information is rearranged, thereby forming a database.

The personal computers PC1 and PC2 are connected by a cable L3 which can communicate information of the images, address information, and the like. The personal computer PC2 obtains image address information photographed on the microfilm from the personal computer PC1.

The personal computer PC2 is connected to the microfilm image scanning device MS by a cable L2 which can communicate information such as image address information, equipment control information, and the like.

The microfilm retrieving device C connected to the microfilm image scanning device MS retrieves the images on the microfilm on the basis of the image address information on the microfilm sent from the personal computer PC2. The image on the microfilm is converted into image data by the microfilm image scanning device MS and the image data is sent to the personal computer PC2.

The personal computer PC2 files the image data sent from the microfilm image scanning device MS.

Figure 2:
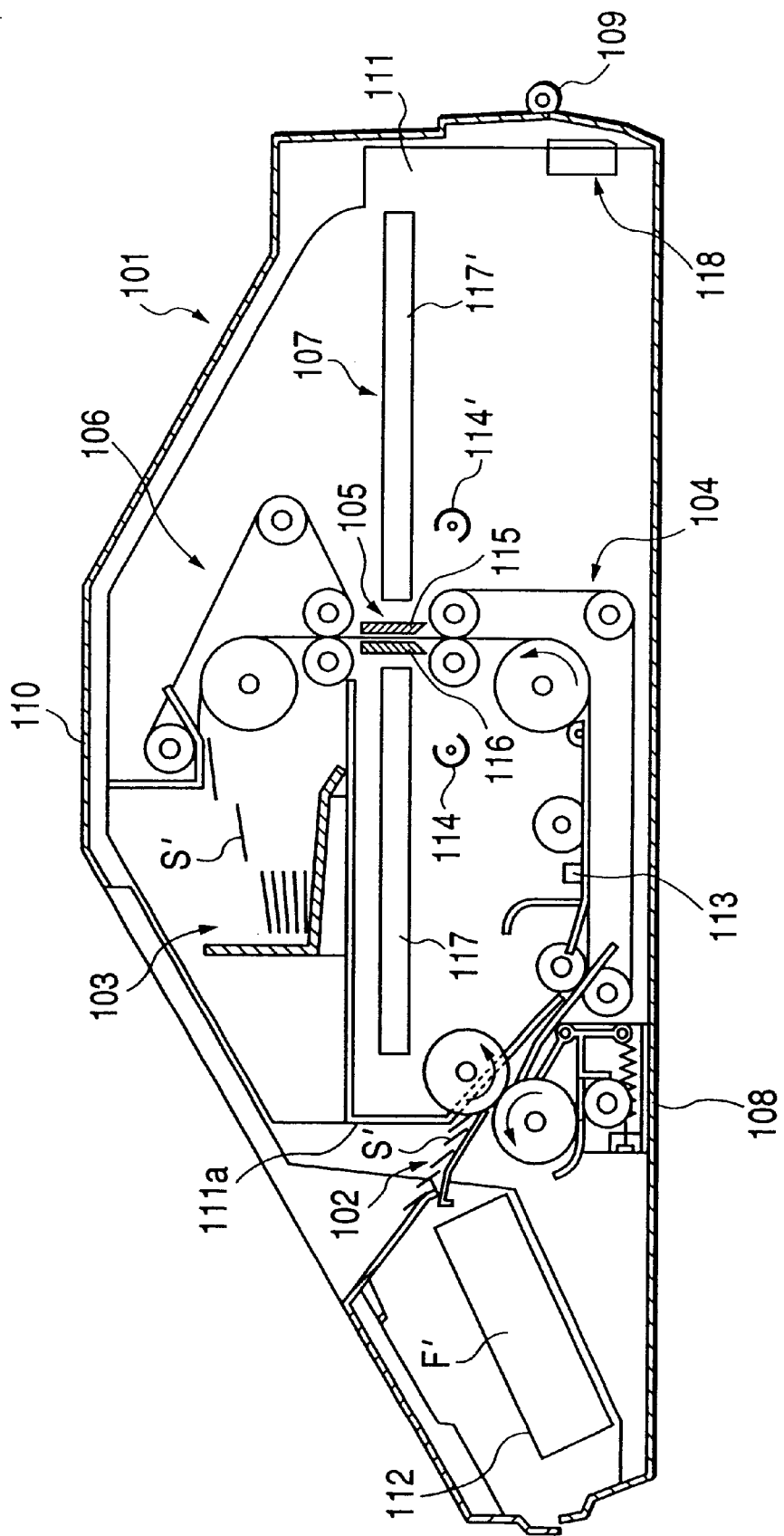
FIG. 2 is a schematic cross sectional view showing the image photographing device.

FIG. 2 shows an example of a rotary camera serving as an image photographing device. The image photographing device 101 has: a supplying portion 102 to supply a sheet-like object S' into the device main body; an ejecting portion 103 to eject the object S' after photographing to the outside of the device main body; and an upstream side conveying portion 104, an exposing portion 105, and a downstream side conveying portion 106 which are sequentially arranged between the supplying portion 102 and ejecting portion 103.

The object S' conveyed to the exposing portion 105 is exposed through an optical system 107, which will be explained hereinlater, so as to be formed as an image onto a film F'.

Further, each portion of the device is arranged in a manner such that an outer cover 110 covers the whole device and a lower edge portion comes into contact with a peripheral edge of a base plate 108 and is axially supported to a rear edge of the base plate 108 by a hinge 109 and can be freely opened or closed in a front opening direction.

In a frame 111 assembled on the base plate 108, the upstream side conveying portion 104 and exposing portion 105 are provided at a lower end of the frame 111, the supplying portion 102 is provided in a front end portion 111a, and the downstream side conveying portion 106 and ejecting portion 103 are provided in an upper portion, respectively. The optical system 107 is mainly arranged on one side and a driving system (not shown) is provided on the other side.

A film chamber 112 in which the film F' is enclosed is provided in front of the supplying portion 102. An object detecting sensor 113 is provided in an upper portion near the upstream of the upstream side conveying portion 104 and detects the passage of the object S'. A detection result is used for control or the like of a shutter near a projecting lens. The exposing portion 105 is constructed by a pair of parallel guide glasses 115 and 116 which are illuminated by a pair of illuminating lamps 114 and 114' and between which the object S' passes.

A connector portion to extract information such as image addresses or the like upon image photographing is arranged at a position shown by 118.

Figure 3A:
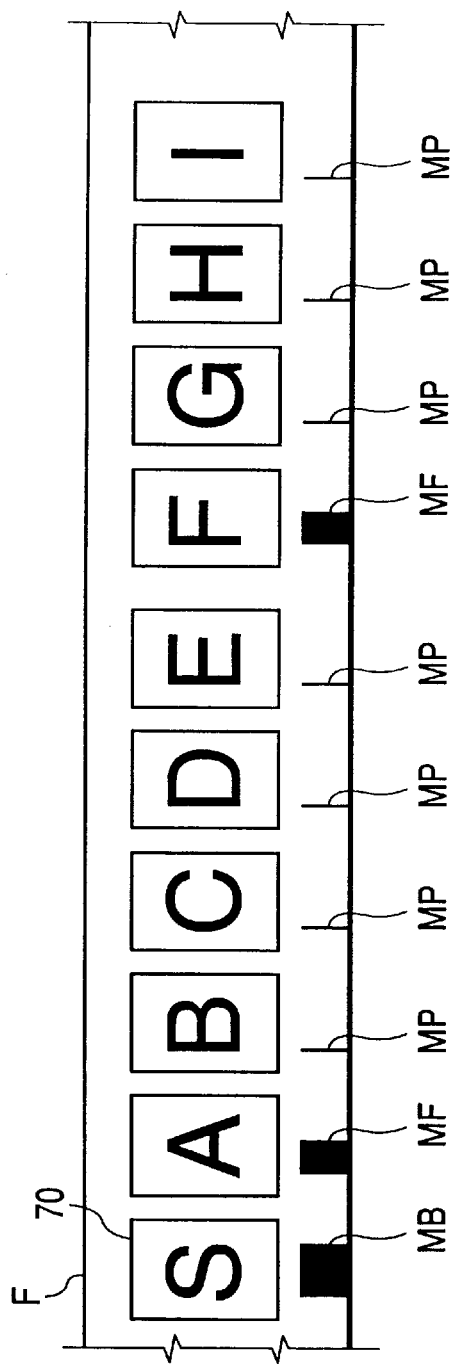
FIGS. 3A and 3B are image diagrams showing a group of images of a microfilm.
Figure 3B:
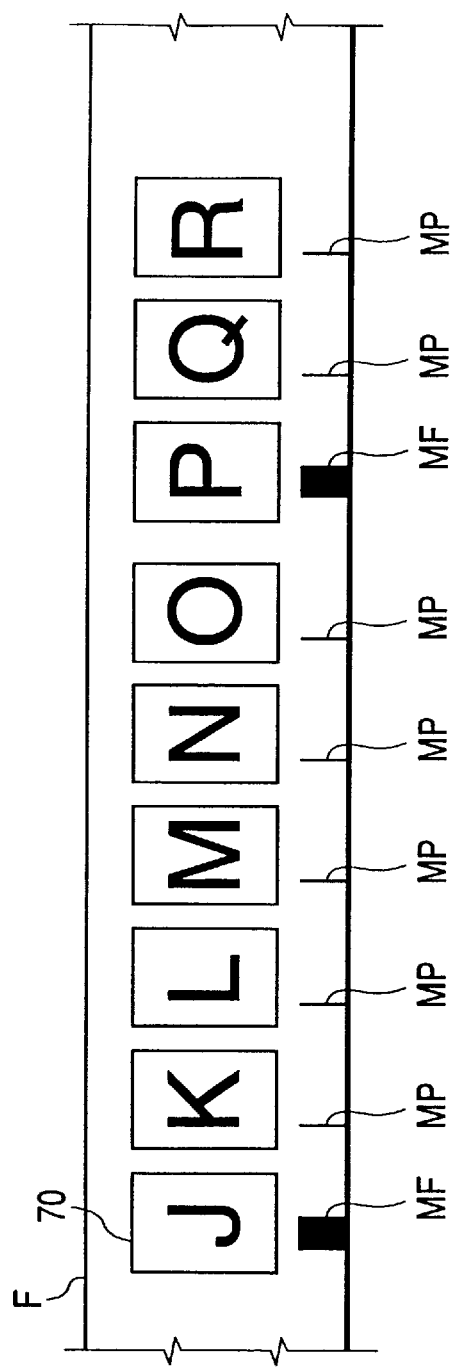

FIGS. 3A and 3B show examples of microfilms photographed by the image photographing device.

As retrieval marks which are added to the images of a microfilm F, there are usually three kinds of large, middle, and small marks. FIGS. 3A and 3B show examples in which a large mark MB, a middle mark MF, and a small mark MP are photographed.

Reference numeral 70 denotes images on the microfilm F which were continuously photographed and images S and A to R are photographed. The image S denotes a start of a large delimiter of the object and the large mark MB called a batch is together photographed.

Each of the images A, F, J, and P is the first image of each document and the middle mark MF called a file is together photographed. Each of the images B to E, G to I, K to O, Q, and R is a page included in the file and the small mark MP called a page is together photographed.

Now, assuming that the document is, for example, a document (offset address 120B) starting from 120 batch, the addresses of the images are set as follows. That is, the address of the image S is set to 120 batch, the address of the image A is set to 120 batch and 1 file, and the address of the image B is set to 120 batch, 1 file, and 1 page. In a manner similar to the above, the address of the image F is set to 120 batch and 2 file, the address of the image J is set to 120 batch and 3 file, and the address of the image R is set to 120 batch, 4 file, and 2 page, respectively.

The image of the object and the retrieval mark are photographed and, at the same time, its image address is converted into an electric signal, is sent from the connector 118 to an external personal computer PC, and is stored.

Figure 4:
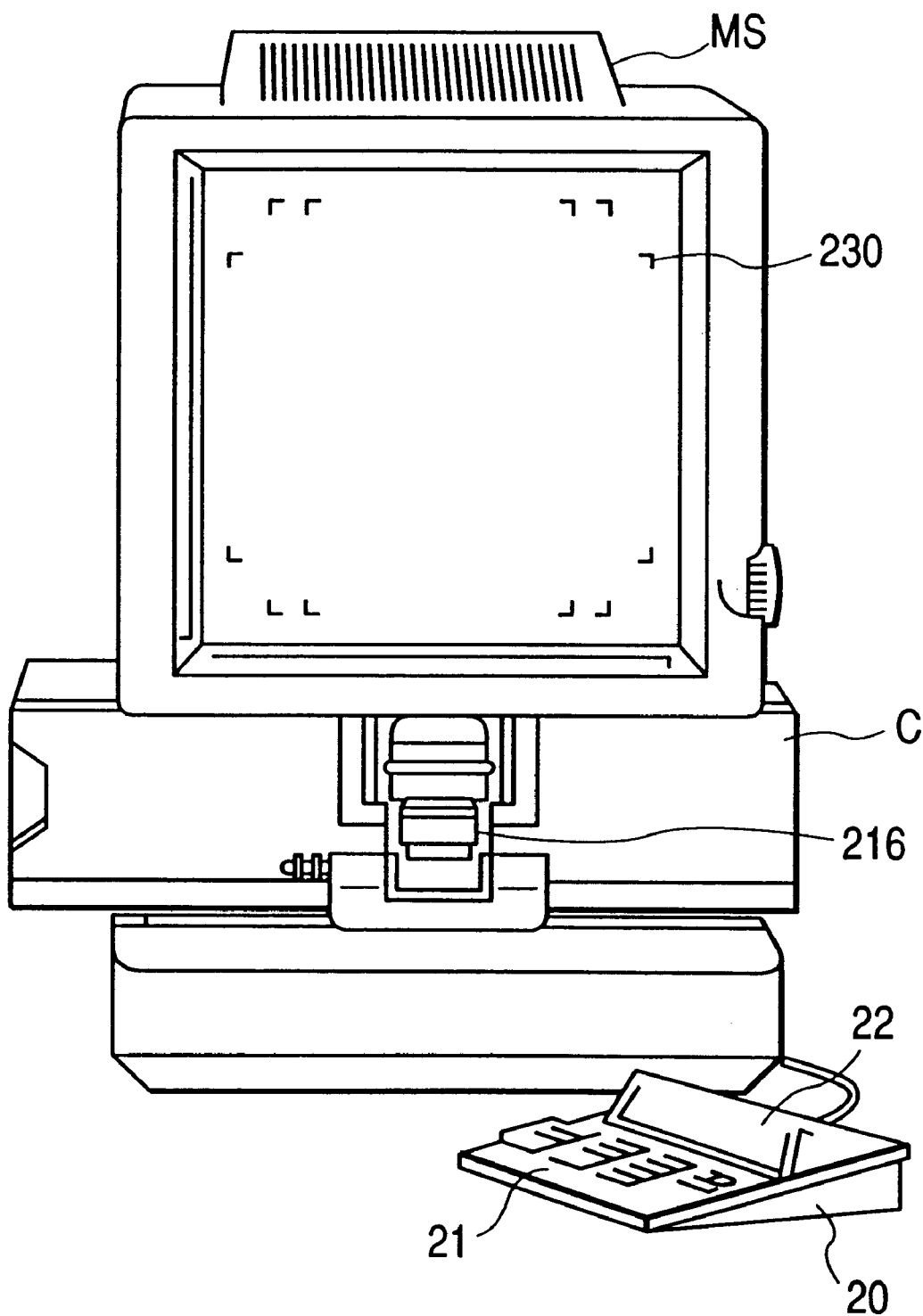
FIG. 4 is a front view showing the microfilm image scanning device and microfilm retrieving device.

FIG. 4 is a front view of the microfilm image scanning device MS in which the microfilm retrieving device C is installed.

MS denotes the microfilm image scanning device; C the microfilm retrieving device installed in the microfilm image scanning device; 230 a reader screen; 216 a projecting lens; and 20 a controlling device (keyboard) serving as inputting means.

The controlling device 20 comprises inputting means 21 and displaying means 22. As inputting means 21, there are numeral keys (ten-key) to set an image address on the film and a retrieval key to instruct the retrieval. Ordinarily, by pressing the retrieval key after an address numerical value to be set was inputted by the numeral keys, the image address can be designated.

Figure 5:
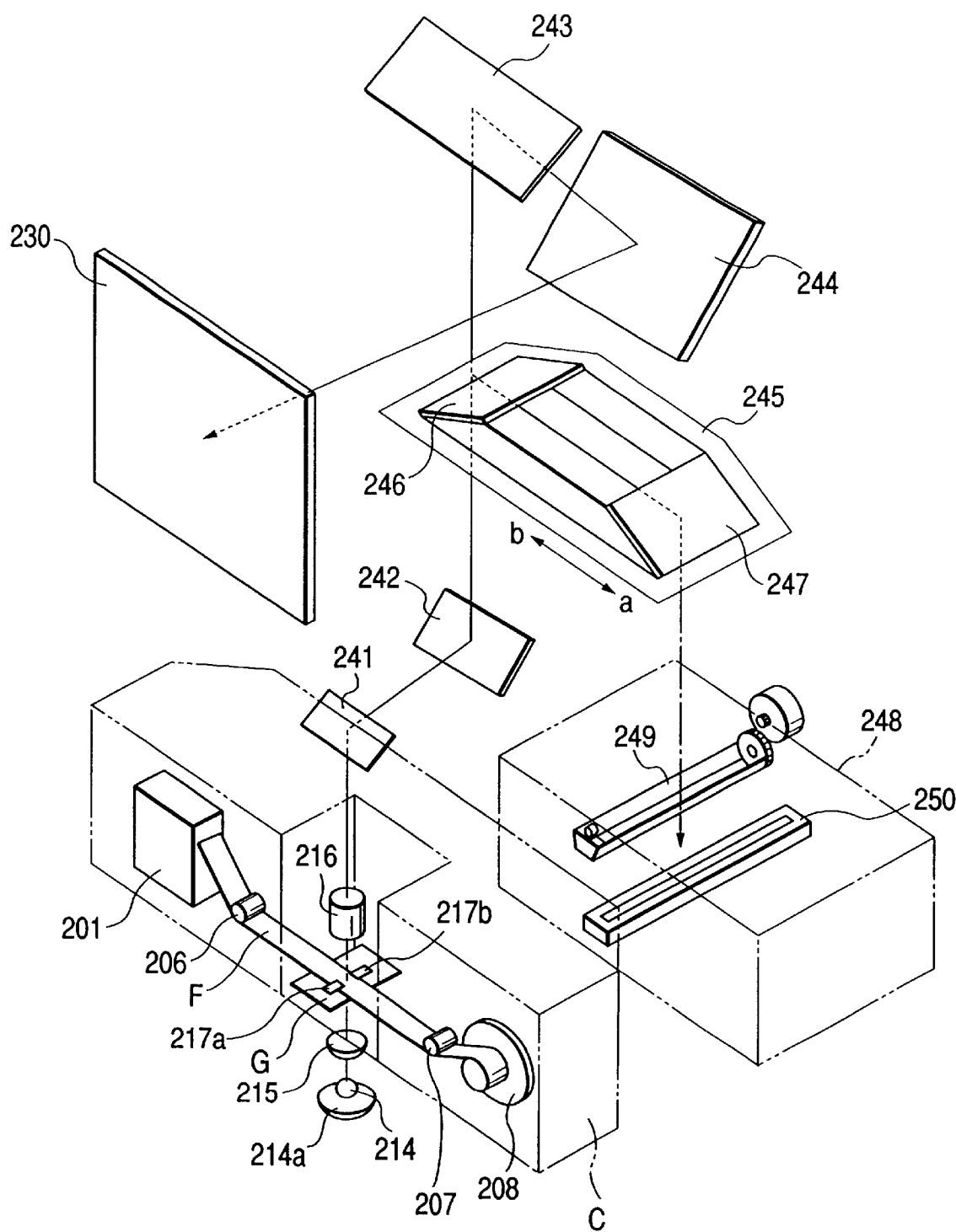
FIG. 5 is a perspective view showing an optical system in the microfilm image scanning device.

FIG. 5 is a perspective view of the optical system in the microfilm image scanning device. As will be explained hereinlater, a desired image frame portion of the roll-shaped microfilm F is positioned to a projecting glass portion G existing at a projecting position by an image frame automatic retrieving operation of the microfilm retrieving device C for the purpose of retrieval.

On the lower side of the projecting glass portion G, the image frame portion is illuminated from the lower surface by illuminating means comprising a light source lamp 214, a spherical mirror 214a, a condenser lens 215, and the like arranged on the main body side of the microfilm image scanning device MS. The film transmitting light of the illumination light is enlarged at a predetermined magnification and projected onto the back surface of the reader screen (light diffusing plate) 230 by a reader portion optical system comprising the projecting lens 216 and fixed first to fourth mirrors 241 to 244. A microimage can be viewed as an enlarged image from the front surface side of the screen 230.

Reference numeral 245 denotes a scanner having a first scanning mirror 246 and a second scanning mirror 247; and 248 a photoelectric transferring portion having a line sensor for converting light into electricity such as a CCD or the like. The scanner 245 is moved forward or backward between the fixed second and third mirrors 242 and 243 of the reader portion optical system at a right angle for an optical path. When the scanner is used as a reader, the first scanning mirror 246 is held at a position where it is shunted from the optical path.

When the user wants to scan and store the microimage which was enlargedly projected to the screen 230, by instructing the image scan, the photoelectric transferring portion 248 is activated. The scanner 245 is moved in the direction so as to enter the optical path and the image light on the optical path is scanned by the first scanning mirror 246.

The scan light passes a slit 249 through the second scanning mirror 247 and reaches a photoelectric transferring element 250. The scanned image is extracted as an electric signal by the photoelectric transferring portion 248. The photoelectric transferring element, an amplifying circuit of the electric signal, a storing portion, and the like are included in the photoelectric transferring portion 248.

Figure 6:
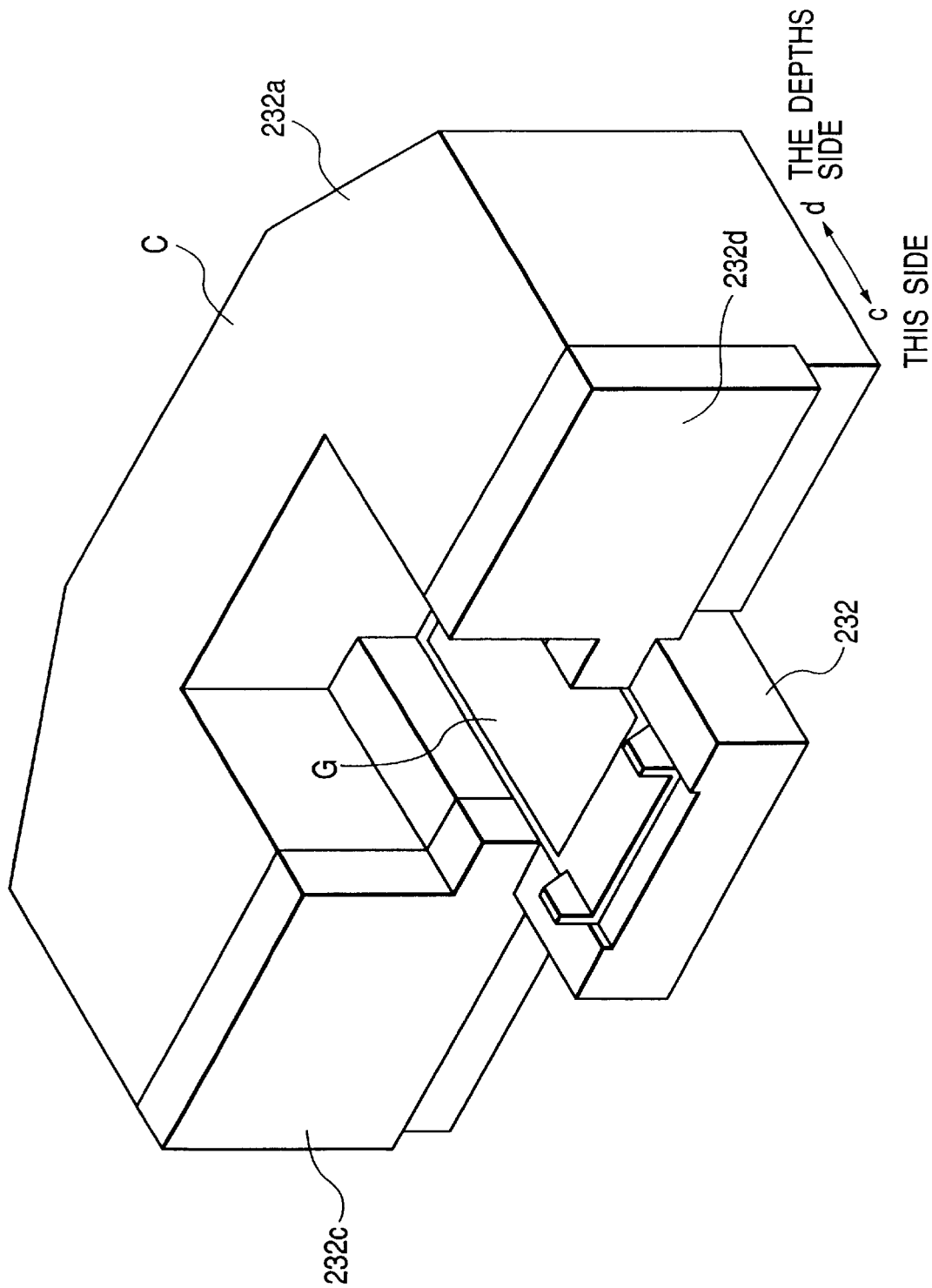
FIG. 6 is a perspective view showing a microfilm retrieving device.

FIG. 6 is an external view of the microfilm retrieving device C. The microfilm retrieving device C of the embodiment is a unit device that is detachable and attachable to the microfilm image scanning device MS and comprises a carrier lower unit 232 and a carrier upper unit 232a. The carrier lower unit 232 is fixed to the microfilm image scanning device MS, thereby attaching the microfilm retrieving device C. G denotes the projecting glass portion.

Figure 7:
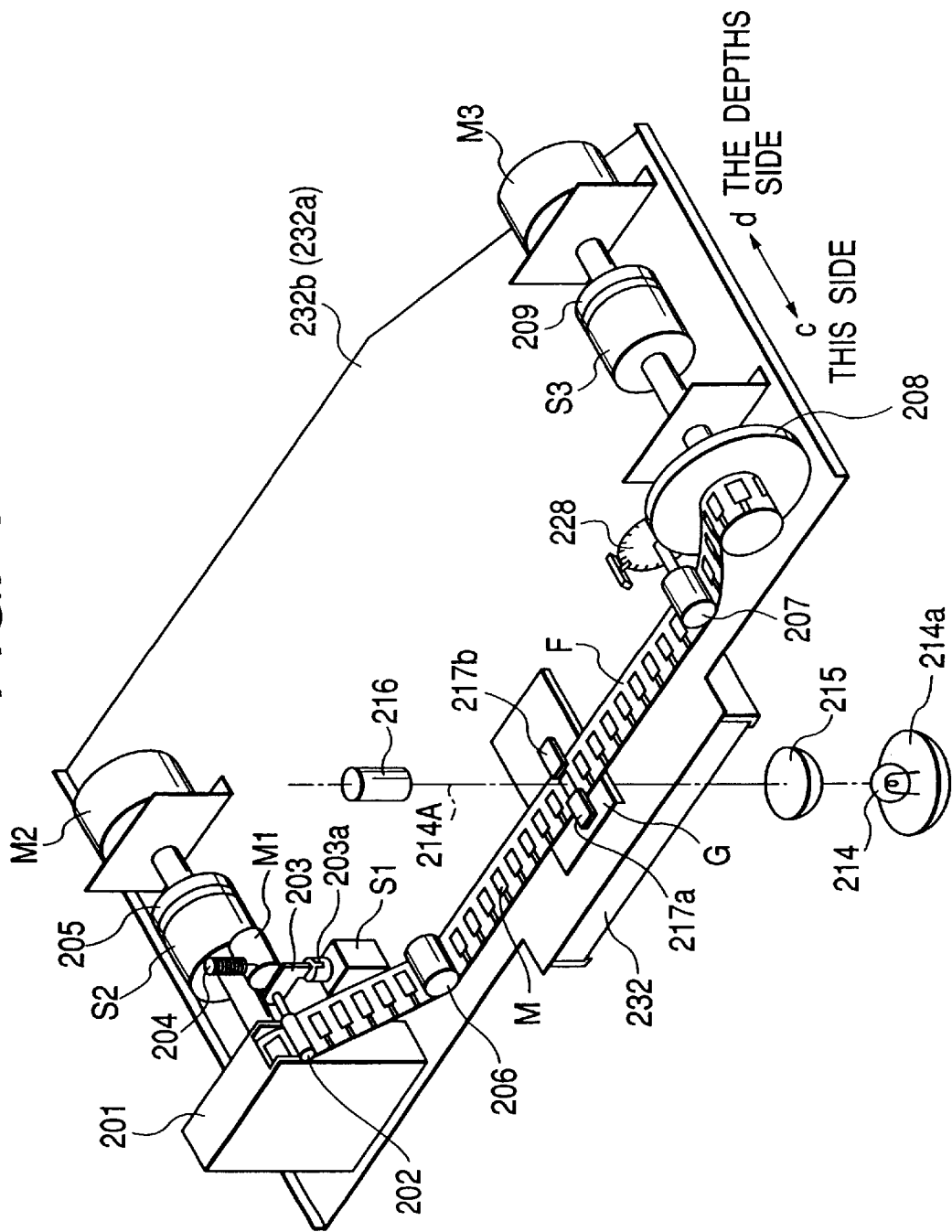
FIG. 7 is a perspective view showing an internal construction of a carrier unit of the microfilm retrieving device.

FIG. 7 is a perspective view of an internal mechanism of the carrier upper unit 232a of the microfilm retrieving device. Reference numeral 232b denotes a bottom plate of the carrier upper unit 232a and 201 indicates a film supplying cartridge in which the long microfilm F serving as a storing medium is enclosed like a roll.

The film cartridge 201 is set into a film attaching portion of the carrier upper unit 232a from the side surface of a front door 232c of the carrier upper unit 232a.

Reference numeral 202 denotes a capstan roller to drive the microfilm F in the cartridge 201; M1 a solenoid to make the capstan roller 202 come into contact with the microfilm F; and 204 a spring for removing the capstan roller 202 from the microfilm F by moving a supporting arm 203, a plunger 203a, and the capstan roller 202.

M2 denotes a film rewinding motor to rotate a film spool in the cartridge 201. S2 indicates a brake solenoid for the film rewinding motor M2. When the brake solenoid S2 does not operate, the motor M2 can rotate. When the brake solenoid S2 operates, a control plate 205 fixed to a motor shaft is attracted, thereby blocking the rotation of the motor M2.

Reference numerals 206 and 207 denote film guide rollers; 208 a take-up reel; M3 a film winding motor to rotate the take-up reel 208; S3 a brake solenoid for the motor M3; and 209 a braking plate.

Reference numeral 214A denotes an optical center of the image projecting portion. A guide plate to guide the microfilm F along a film feeding path between the cartridge 201 and take-up reel 208 is provided.

Reference numerals 217a and 217b denote retrieval mark detecting means each for detecting a retrieval mark (for measurement) M provided on the side of each image frame portion of the microfilm F. In the projecting glass portion G corresponding to the projecting position in case of the embodiment, the detecting means 217a and 217b are arranged on respective sides of a film feeding path. Reference numeral 217a denotes the retrieval mark detecting means on the A channel side; 217b indicates the retrieval mark detecting means on the B channel side.

Each of the detecting means 217a and 217b has therein a photoelectric transferring element and detects the retrieval mark M when the light from the lamp 214 is interrupted by the retrieval mark M while the microfilm F is forwardly or reversely conveyed as will be explained hereinlater. Each detecting means generates a retrieval mark detection signal as mark information to processing means 10, which will be explained hereinlater. Reference numeral 228 denotes a photoencoder to detect a conveying speed and a conveying amount of the microfilm F.

Figure 8:
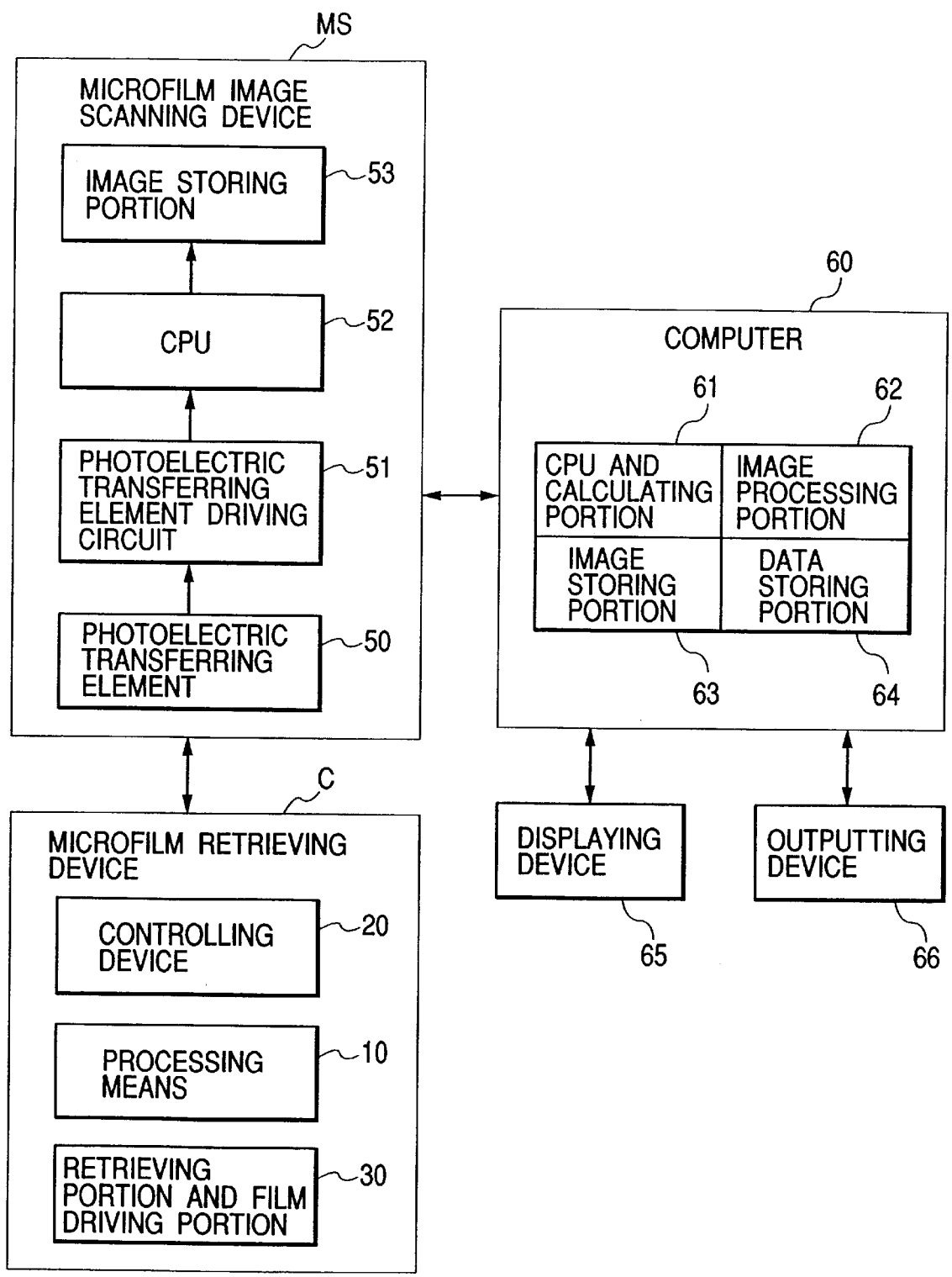
FIG. 8 is a block diagram showing an image data filing system.

FIG. 8 is a block diagram for explaining the image scanning device.

As will be explained in detail in FIG. 9, the microfilm retrieving device C comprises a retrieving portion and film driving portion 30, the processing means 10, the controlling device 20, and the like.

In the microfilm image scanning device MS, the image of the microfilm F which was retrieved by the microfilm retrieving device C and projected is converted into an electric signal by a photoelectric transferring element 50. The signal is read out and amplified by a photoelectric transferring element driving circuit 51. A CPU 52 of the microfilm image scanning device temporarily stores the amplified signal as an image signal into an image storing portion 53.

Reference numeral 60 denotes a computer, connected to the microfilm image scanning device MS, for controlling it. The computer 60 instructs a retrieval to the microfilm retrieving device C via the microfilm image scanning device MS or extracts the signal of the scanned image data from the microfilm image scanning device MS and stores.

Reference numeral 61 denotes a CPU and calculating portion of the computer; 62 an image processing portion to process the image data extracted from the microfilm image scanning device; 63 an image storing portion to store the extracted image data; and 64 a data storing portion.

Reference numeral 65 denotes a displaying device such as a CRT or the like connected to the computer; and 66 indicates an outputting device as a printer such as an LBP or the like.

Figure 9:
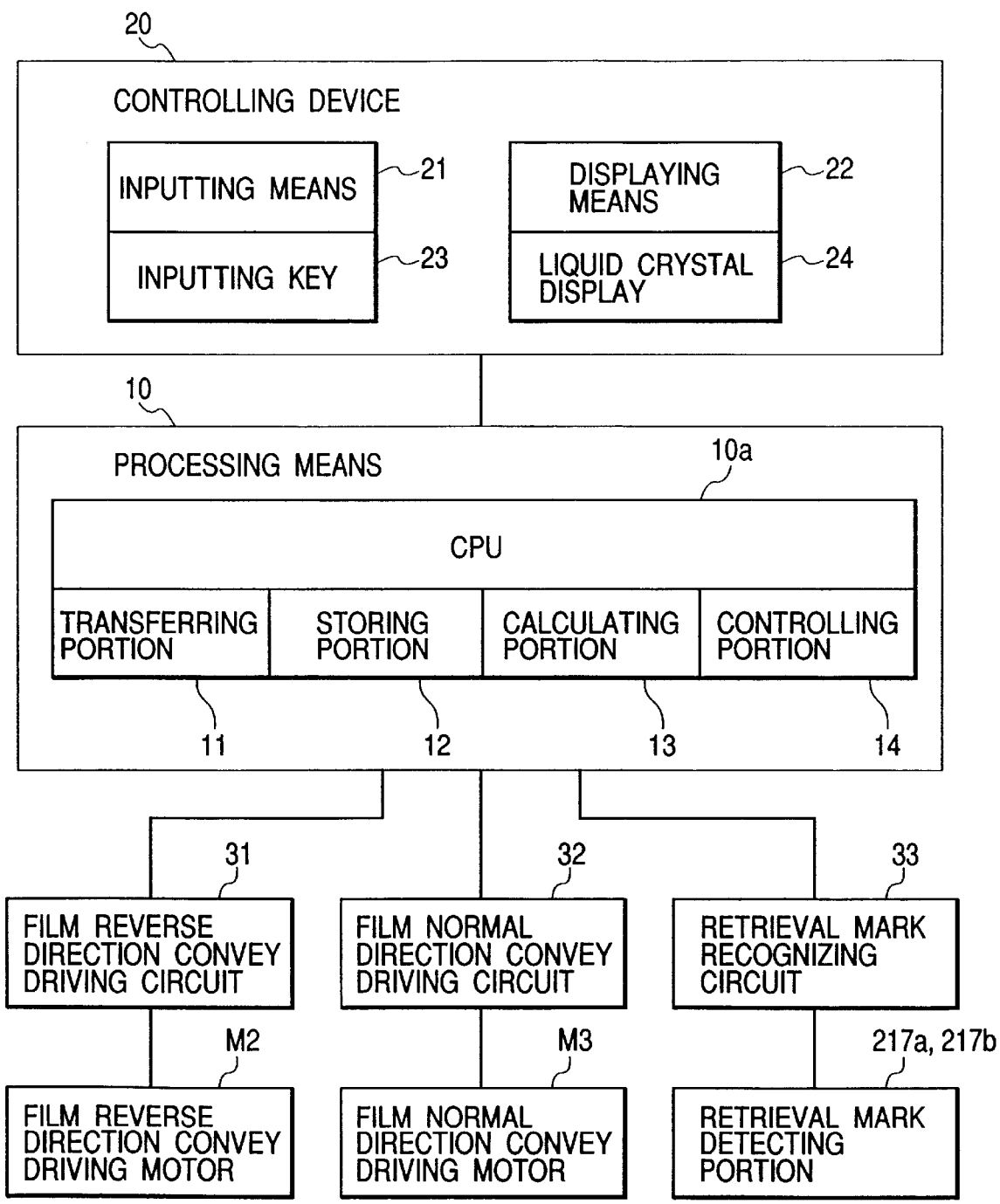
FIG. 9 is a block diagram showing a construction of a main controlling circuit of the microfilm retrieving device.

FIG. 9 is a block diagram showing a construction of a main controlling circuit of the microfilm retrieving device C.

Reference numeral 10 denotes the processing means such as a microprocessor or the like for batch processing mark information of the microfilm F as a storing medium which was detected by the mark detecting means (retrieval mark detecting portions) 217a and 217b and, further, recognized as a retrieval mark by a retrieval mark recognizing circuit 33.

The processing means 10 comprises: a transferring portion 11; a storing portion 12 as storing means for storing the mark information and image frames; a calculating portion 13; and a controlling portion 14.

The transferring portion 11 transfers the mark information derived from the retrieval mark recognizing circuit 33 to the storing portion 12. The storing portion 12 stores the number (image address) of the designated image frame instructed from the computer or inputted from the inputting means 21 such as a keyboard or the like of the controlling device 20 and the mark information transferred from the transferring portion 11.

The controlling portion 14 performs an integrated control (for example, trouble shooting) in the processing means 10 and also serves to control a film reverse and normal direction convey driving circuits 31 and 32 connected to film reverse and normal direction convey driving motors M2 and M3 to convey the microfilm F in the reverse and normal directions.

The calculating portion 13 compares the image frame number instructed from the computer or the image frame number inputted from the inputting means 21 with the mark information stored in the storing portion 12 and generates a comparison result to the controlling portion 14.

Although the controlling device 20 comprises the inputting means 21 and displaying means 22, the inputting means 21 is made up of an inputting key 23 to set an image address for retrieval or the like. The displaying means 22 is constructed by a liquid crystal display 24 to display an address of an image frame or the like.

When the cartridge 201 is loaded into a loading portion of the upper unit 232a of the microfilm retrieving device C and a desired image frame number is inputted by the inputting means 21 of the computer, the motor M1 is driven through the processing means 10 and the solenoid S is made operative.

Thus, the capstan roller 202 comes into contact with a lead tape portion of the microfilm F projected from the cartridge 201 and the microfilm F is pulled out from the cartridge 201. A leading end of the lead tape portion is conveyed along the film feeding path comprising the film guide roller 206→projecting glass portion G→film guide roller 207→take-up reel 208.

When the leading end of the lead tape portion approaches the take-up reel 208, the film winding motor M3 is driven and the lead tape portion is wrapped around the take-up reel 208.

Although the motor M1 and solenoid S1 are subsequently made inoperative, the microfilm F is further normally (forwardly) conveyed from the cartridge 201 side to the take-up reel 208 side by the rotation of the take-up reel 208.

During the conveyance of the microfilm F, the retrieval mark M detected by the retrieval mark detecting means 217a and 217b is compared with the pre-stored frame number after the elapse of a predetermined time by the calculating portion 13. When they coincide, a stop signal is transmitted from the controlling portion 14. The brake solenoid S3 is made operative and controls a take-up shaft of the take-up reel 208. Similarly, the brake solenoid S2 also controls the shaft of the motor M2 and restricts an inertia rotation of a feed spool in the cartridge 201. The feeding operation of the microfilm F is stopped and a desired image frame portion of the microfilm F is retrieved and stopped in the projecting glass portion G as a projecting position. The microimage of the image frame portion is projected to the screen 230 through the projecting lens 216.

A desired image frame portion of the microfilm F is also automatically retrieved in a reverse conveyance control step of the microfilm F from the take-up reel 208 side to the cartridge 201 side.

Figure 10:
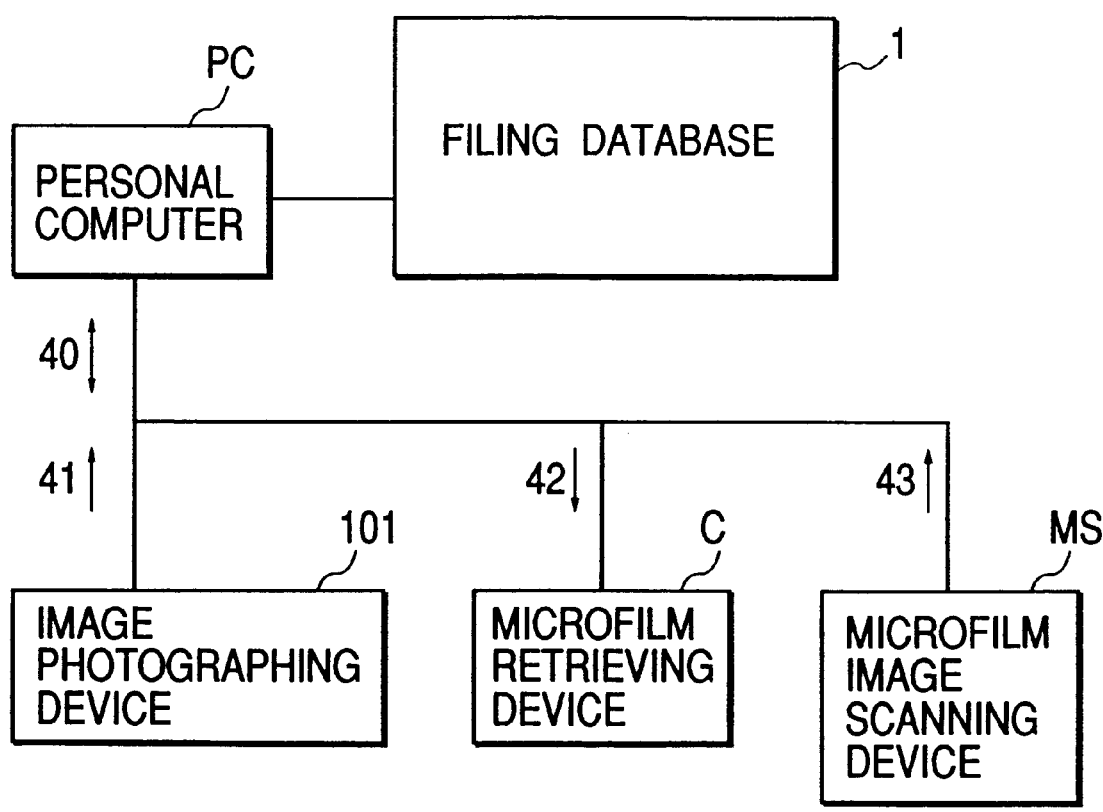
FIG. 10 is a block diagram showing an image data filing system according to the first embodiment.

FIG. 10 is a constructional diagram of an image data filing system according to the embodiment in which the image photographing device 101, microfilm retrieving device C, and microfilm image scanning device MS are connected to the personal computer PC.

In the construction of the system of FIG. 1, the personal computers PC are connected to the image photographing device 101 and microfilm image scanning device MS respectively. FIG. 10 shows an example in which one personal computer PC has a database and controls those devices.

PC denotes the personal computer to control the devices and to form, retrieve, and execute a database. Reference numeral 101 denotes the image photographing device; C the microfilm retrieving device; and MS the microfilm image scanning device. The personal computer PC has a filing database 1 to store the image address as index information extracted from the image photographing device 101, the retrieval address as retrieval information for the microfilm retrieving device C, and the image data derived from the microfilm image scanning device MS. Arrows 40 to 43 indicate a flow of data to form a filing database.

Figure 11A:
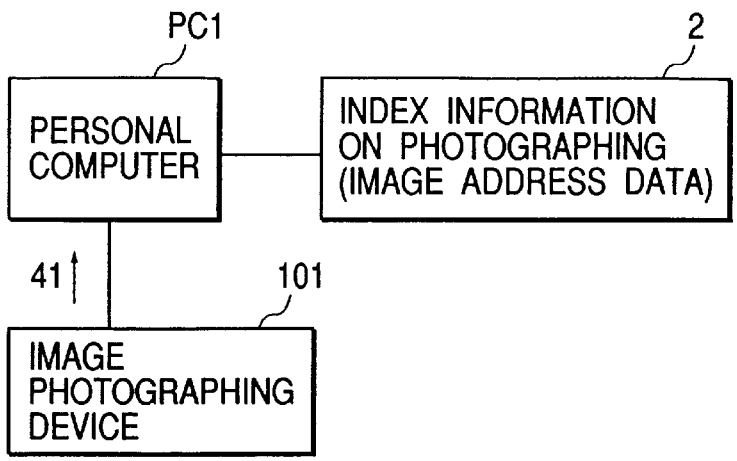
FIG. 11A is a block diagram showing the image photographing device and personal computer according to the first embodiment.

FIG. 11A shows an example of a construction of the device when index information is extracted from the image photographing device 101. The personal computer PC1 is connected to the image photographing device 101, fetches the image address, as index information, when the object is photographed onto the microfilm F, and stores it into a storing device as index information on photographing (image address) 2. The arrow 41 indicates the flowing direction of the index information.

Figure 11B:
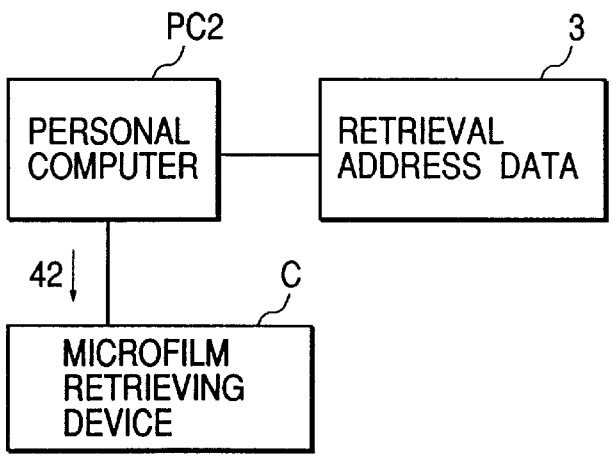
FIG. 11B is a block diagram showing the microfilm retrieving device and personal computer according to the first embodiment.

FIG. 11B shows an example of a construction when the personal computer PC2 transmits a desired image address to the microfilm retrieving device C from retrieval address data 3 stored for the microfilm retrieving device and retrieves it. The retrieval address data 3 is formed on the basis of the index information 2 on photographing. The arrow 42 indicates the flowing direction of the retrieval address data 3.

Figure 11C:
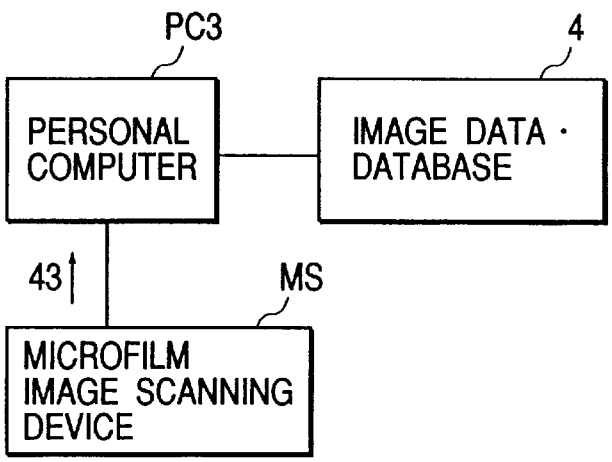
FIG. 11C is a block diagram showing the microfilm image scanning device and personal computer according to the first embodiment.

FIG. 11C shows a construction of a system in which the image data retrieved in FIG. 11B is transmitted from the image scanning device MS to the personal computer PC3 and stored into an image data.database 4 provided in the personal computer PC3. The arrow 43 indicates the flowing direction of the image data of the electronized microfilm image.

PC1 to PC3 in FIGS. 11A to 11C denote the personal computer PC in FIG. 10. The data obtained by combining the index information 2 on photographing, retrieval address data 3, and data of the image data.database 4 becomes the filing database 1 in FIG. 10.

Figures 12A, 12B:
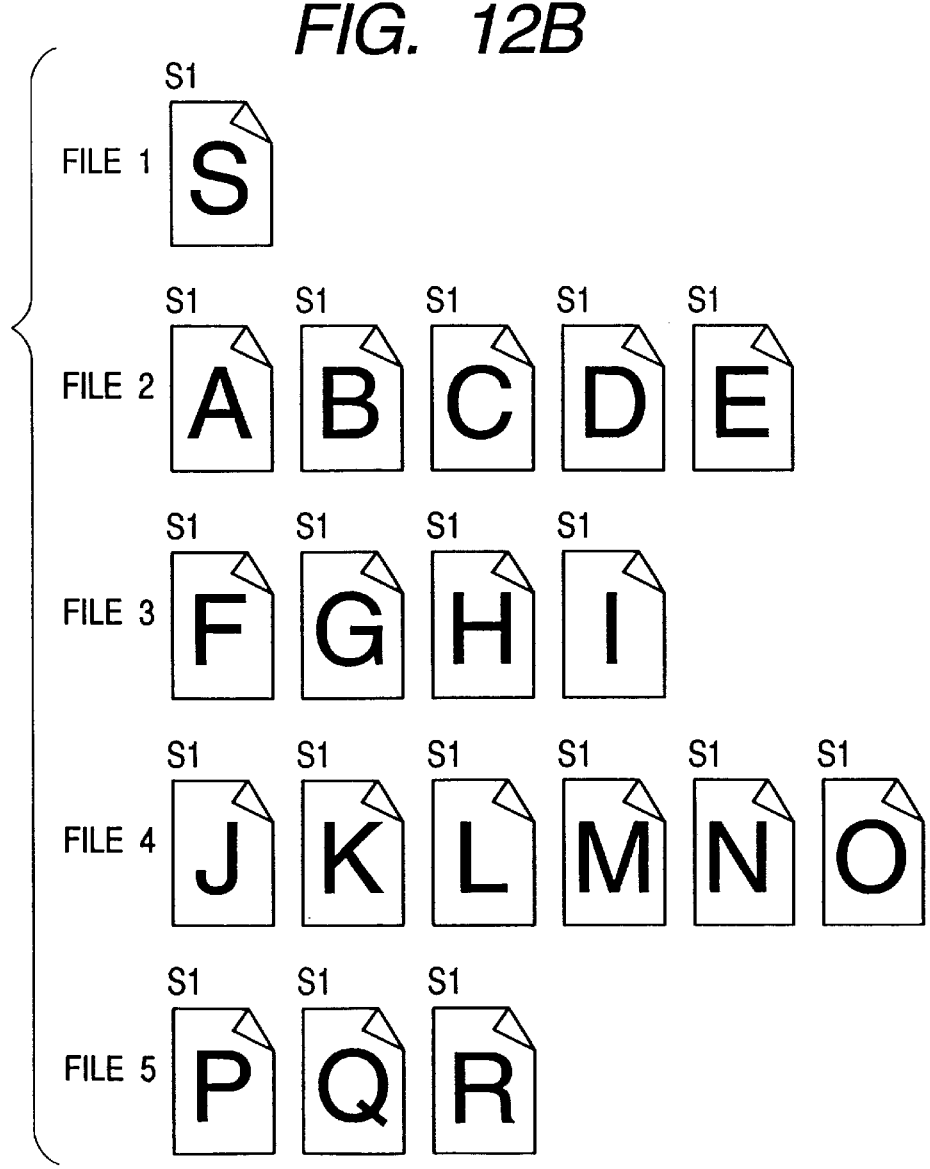
FIG. 12A is a table showing a database of image addresses upon photographing according to the first embodiment.
FIG. 12B is an image diagram showing a photographed object.

FIG. 12A shows an example in the case where the index data is extracted from the image photographing device 101 in FIG. 11A and is stored in the index information 2 on photographing. A table shows a list in which address data upon photographing is sequentially listed up.

Each time a delimiter of B (batch mark) or F (file mark) appears, the file number is updated to files 1 to 5 and the number of pages existing between the delimiters is also displayed. Although the image S is actually the first image of the film and becomes 1B, the image address when the image is photographed starts from 121B because the offset is equal to 120B. In a manner similar to the above, the file 2 and file 3 are formed in accordance with the order of data of 121B1F and 121B3F.

FIG. 12B shows an example of the image of the object S1 photographed as files 1 to 5. In the files, 1, 5, 4, 6, and 3 objects are photographed, respectively.

FIG. 13A shows an example of retrieval address data 3 to transmit the retrieval address to the microfilm retrieving device C in FIG. 11B. Although the image address of the file 1 is equal to 121B, since the offset is equal to 120B, when the image S is retrieved, the address obtained by subtracting the offset address is instructed. Therefore, the retrieval addresses in this table are sequentially set to 1B, 1B1F, 1B2F, 1B3F, and 1B4F.

FIGS. 13B and 13C show examples of a microfilm that is retrieved by a retrieving device similar to that in FIGS. 3A and 3B. Upon photographing, the retrieval is performed per unit file divided by MB and MF.

Figures 14A, 14B:
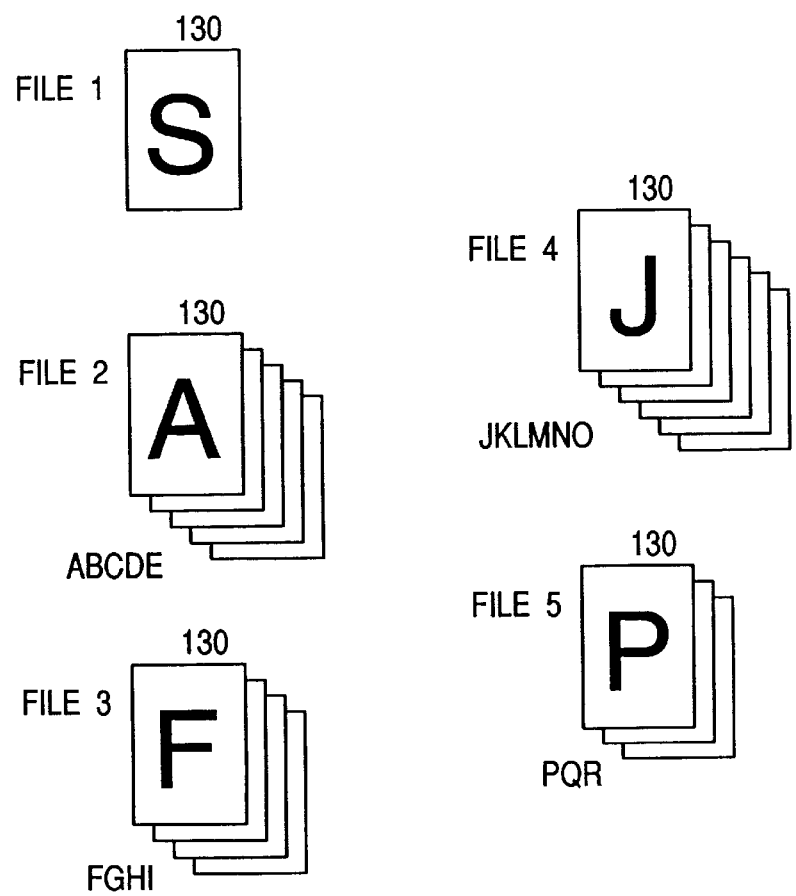
FIG. 14A is a table showing a database of retrieval addresses and image data according to the first embodiment.
FIG. 14B is an image diagram showing stored image data.

FIG. 14A shows an example in which a microfilm image 130 scanned by the image scanning device MS in FIG. 11C is allocated to each of the files 1 to 5. The image S scanned from the microfilm is allocated to the file 1. Likewise, the scanned images A to E are allocated to the file 2. Similarly, each time the microfilm is scanned, the scanned images are allocated to the retrieval addresses in the files 3 to 5.

FIG. 15 is a Table showing an example of the filing database 1 which was formed on the basis of the address data and image data formed in FIGS. 12A to 14B and was also shown in FIG. 10.

Although the scanned images S and A to R have been filed in the filing database 1, indices of the image addresses 121B and 121B1F to 121B4F as index information formed upon photographing are allocated to those images and the resultant images have been saved in the filing database. Therefore, in the personal computer PC, by instructing the image address to the filing database, a desired scan image can be retrieved.

Figure 16A:
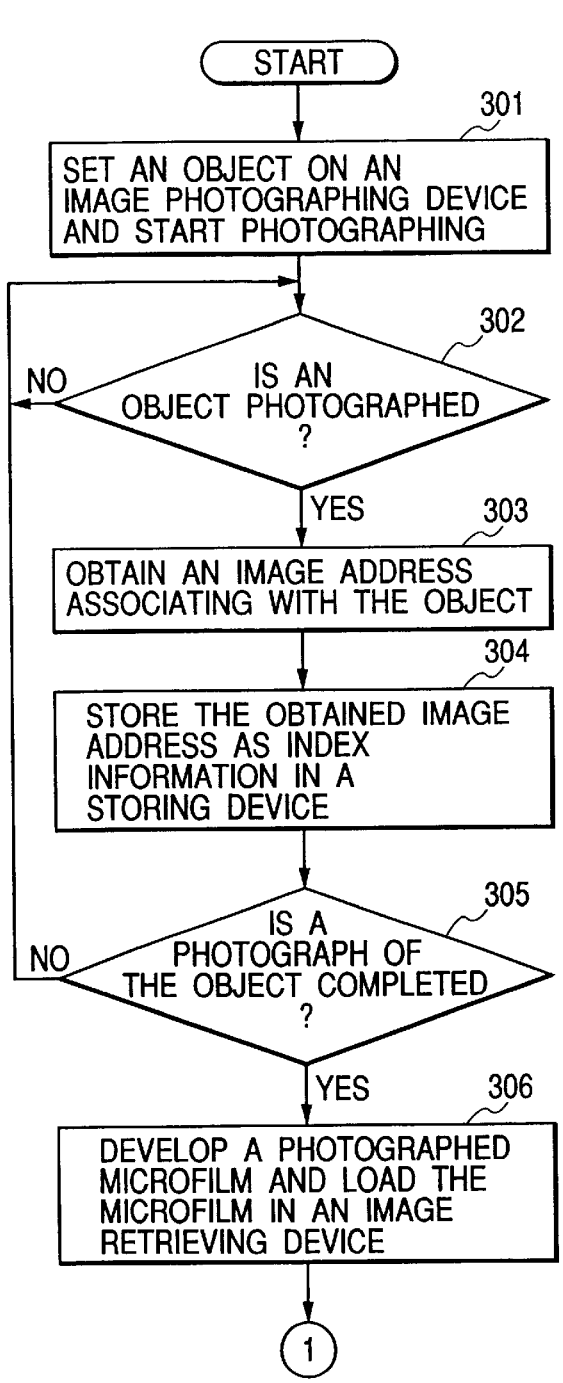
FIGS. 16A and 16B are flowcharts showing an image data filing according to the first embodiment.
Figure 16B:
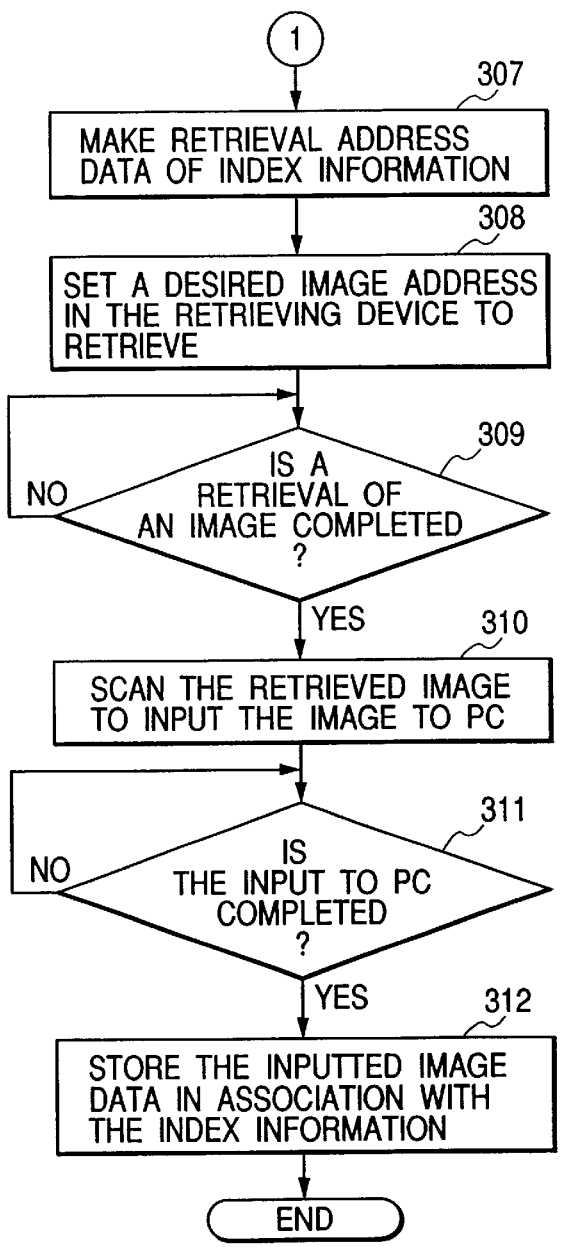

FIGS. 16A and 16B are flowcharts for explaining the first embodiment.

In the image data filing system in which the image photographing device, microfilm retrieving device, and image scanning device are connected as shown in FIG. 1 or FIG. 10, the object is first set into the image photographing device 101 and the photographing is started in step 301.

In step 302, the system waits for the end of the photographing each time one image of the object is photographed. At a time point of the completion of the photographing of the object, the image address for the object is derived to the personal computer PC in step 303.

In step 304, the obtained image addresses are stored as index information into the personal computer PC as shown in FIG. 12A. When the photographing of all of the images of a predetermined object is finished (step 305), the microfilm is developed and is further loaded into the microfilm retrieving device C in step 306.

In step 307, the actual image address is converted into the retrieval address as shown in FIG. 13A and a table in which it is compared with the index information is formed and stored in the storing device.

In step 308, a desired image address is retrieved by using this table. When the retrieval of the image is finished in step 309, the image is scanned in step 310 and is inputted to the personal computer PC.

After completion of the input of the image to the personal computer PC (step 311), the scanned and inputted image data is stored into the image data database in association with the index information (image address) as shown in FIG. 15.

As mentioned above, when the object is photographed to the microfilm, on the basis of the index information inputted from the image photographing device 101, the image data inputted from the microfilm, F after the development is saved into the personal computer PC in association therewith, so that an image filing with the index can be performed without indexing each time the microfilm is scanned by the microfilm image scanning device MS.

[Second Embodiment]

FIGS. 17A to 17C are tables for explaining the second embodiment of the invention.

In the second embodiment, a bar code written on each object (original) is read by a bar code reader serving as code reading means, a database is formed on the basis of the code information as index information, and the image data scanned by the microfilm image scanning device MS is associated to the database. Since the other construction and operation are substantially the same as those in the first embodiment, the same constructing portions are designated by the same reference numerals and their descriptions are omitted.

Figures 19, 20:
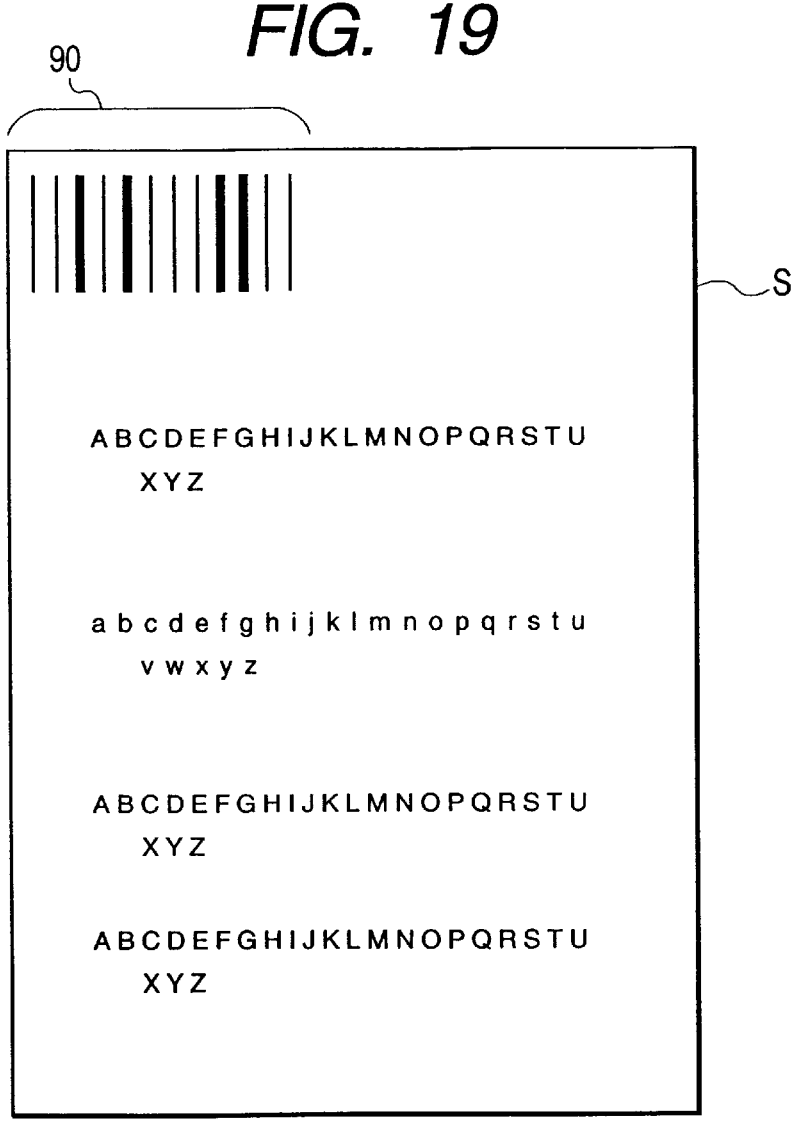
FIG. 19 is an image diagram showing an example of an object which is used in the second embodiment.
FIG. 20 is a table showing new marks and a database of the code information and image data according to the second embodiment.
Figure 21:
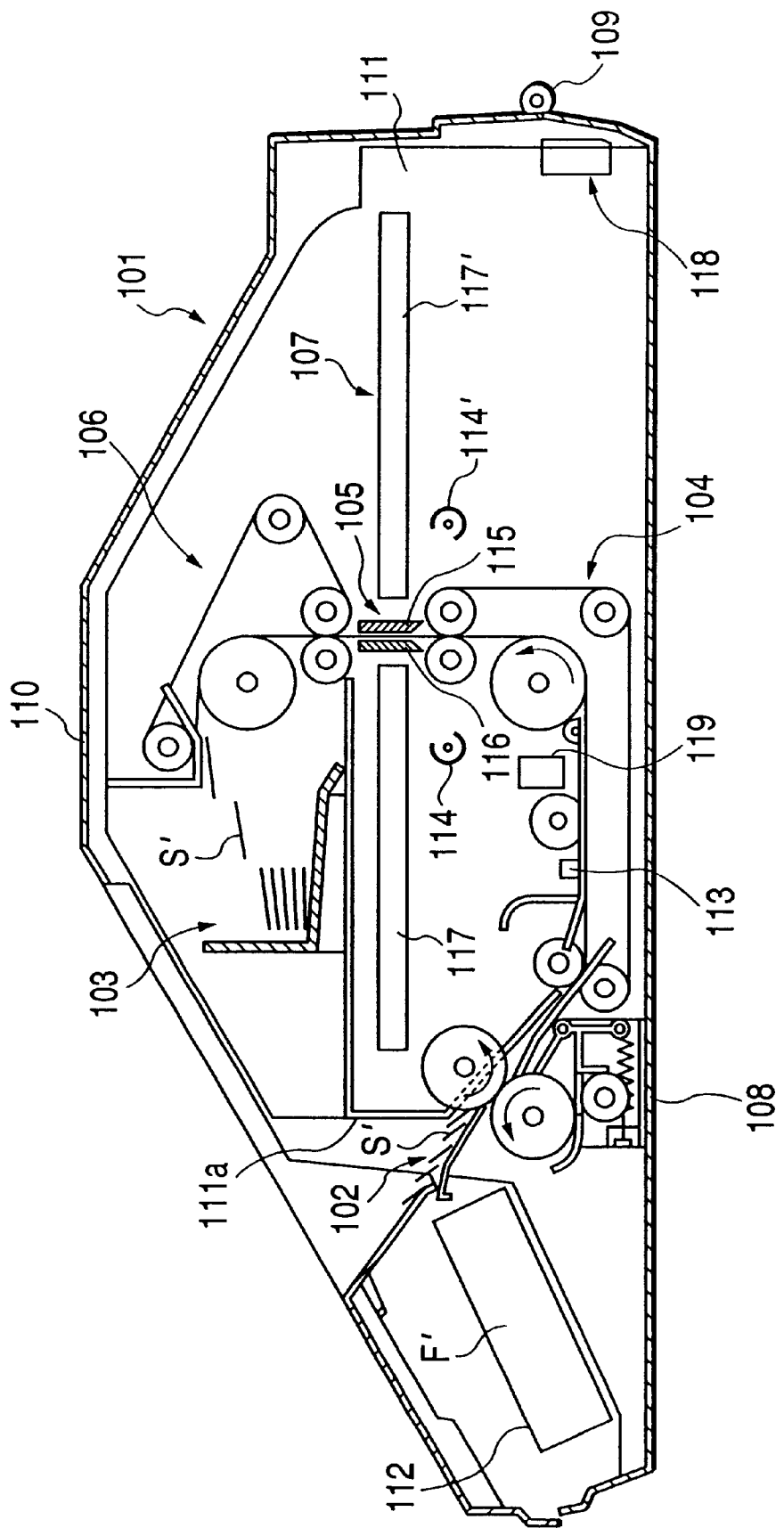
FIG. 21 is a schematic cross sectional view showing an image photographing device having a bar code reader.

FIG. 19 shows an example of an object added with a well-known bar code. The bar code is read by a well-known bar code reader 119 of the image photographing device 101 shown in FIG. 21. Code information read out from the connector 118 is sent in a manner similar to the first embodiment. FIG. 17A shows an example in which when a bar code is added to the front page of one file as a delimiter of the object, each code is read.

Although the image addresses when photographing by the image photographing device 101 are set to 121B to 121B4F, the read codes are not arranged in accordance with the order from the small code. FIG. 17B shows an example in which the image addresses are changed to the retrieval addresses in a manner similar to the first embodiment. FIG. 17C shows an example in which they are further rearranged in accordance with the order of the read codes. A database is formed from the code information read out upon photographing by the image photographing device 101. The files 1 to 5 are rearranged in accordance with the order of the codes and they are further stored as a database. The image data obtained by retrieving the images and converting is associated to each file.

FIGS. 18A and 18B are flowcharts for explaining the second embodiment.

In the system in which the image photographing device 101, microfilm retrieving device C, and microfilm image scanning device MS are connected as shown in FIG. 1 or FIG. 10, first, the object is set into the image photographing device 101 and the photographing is started in step 350, and in step 351, each time one image of the object is photographed, the system waits for the end of the photographing and, at a time point of the completion of the photographing of the object, the image address for the object is inputted to the personal computer PC in step 352 in a manner similar to the first embodiment.

At the same time, if the bar code was photographed to the object, the bar code of the object is read out by the bar code reader and the read code is derived to the personal computer PC in step 353. In step 354, the derived image address or code is stored as index information into the storing device as shown in FIG. 12A.

FIG. 17B shows a table in which the retrieval addresses and read codes are combined. When the photographing of all images of a predetermined object is finished (step 355), the microfilm F is developed and is further loaded into the microfilm retrieving device C in step 356. A table of the retrieval address data and codes is formed in step 357. This table is used to retrieve in step 358 and a desired image address is extracted. In step 359, the system waits for the end of the retrieval of the image.

In step 360, the code for the retrieval address is set to the index information. In step 361, the read codes are rearranged in accordance with the order. In step 362, the image is scanned and inputted to the personal computer PC.

When the input to the personal computer PC is finished (363), the scanned and inputted image data is stored into the database in association with the index data as shown in FIG. 17C (364).

With this method, on the basis of the code information of the bar codes fetched from the image photographing device 101 upon photographing of the microfilm, the image data fetched from the microfilm after the development is stored into the storing device of the personal computer PC in association with the code information. Thus, an image filing with the index can be performed without indexing each time the microfilm is scanned by the microfilm image scanning device MS.

In the second embodiment, the example in which the bar codes added to the object are read out and the database is formed has been shown. However, another method such as a reading system of other codes, characters of an object, or the like can be also used so long as an index can be allocated upon image photographing.

In the embodiment, the database is first formed and the filing database is formed in association with the scanned image. However, when the image to be scanned is retrieved, although the scanning direction from the front side to the rear side of the film provides a high efficiency, there is a case where the data of the database is not arranged in accordance with the order as shown in FIG. 15.

Therefore, FIG. 20 shows an example in which the discriminating means is allowed to discriminate the presence or absence of the image data on the basis of the index information associated to each image, discrimination information is used as one data item, when the image data has already existed in any one of the files 1 to 5, the information of the existed image is fetched, and when the image data does not exist, a mark indicative of the absence, namely, a new mark 91 is added.

In case of using a system such that only the images of the files which are necessary are scanned at random is used, in the image data filing system, there is a case where the file which has already been scanned is found during the scanning.

In such a case, if it is discriminated by the discriminating means that the image has already been scanned, it is also possible to skip the file without scanning the image by the microfilm image scanning device.

Although the example in which one personal computer is used has been shown in the present embodiment, two or a plurality of personal computers can be also connected by a network or the like and can be used as shown in FIG. 1.

According to the invention, it is possible to. provide an image data filing system in which the index information is stored upon photographing of the original, the image data which is stored is associated to the index information, and an index is allocated to the image data, so that the image data can be filed at a high speed, there is no need to input the index, and the database formed by the stored image data can be used as it is.

What is claimed is:

1. An image filing system comprising:

first recording means for recording an image of an original and retrieval information based on index information added to the image to retrieve the image onto a first recording medium, for generating address information of the image from retrieval information, and for forming a table including image information and the address information;

retrieving means for retrieving a desired one of the images recorded on said first recording medium on the basis of address information in the table; and second recording means for converting the image retrieved by said retrieving means into image data and recording onto a second recording medium, wherein when said image data is recorded, said second recording means records retrieval data associated with the address information corresponding to said image data onto said second recording medium.

2. An image filing system according to claim 1, wherein said first recording medium is a microfilm.

3. An image filing method comprising the steps of:

recording an image of an original and retrieval information based on index information added to the image to retrieve the image onto a first recording medium, generating address information of the image from retrieval information, and forming a table including image information and the address information;

retrieving a desired one of the images recorded on the first recording medium based on the address information in the table;

converting the image retrieved into image data and recording onto a second recording medium; and when the image data is recorded, recording retrieval data associated with the address information corresponding- to the image data onto the second recording medium.

4. A method according to claim 3, wherein the first recording medium is a microfilm.

5. A storage medium for storing a computer program for performing image filing comprising:

a code for recording an image of an original and retrieval information based on index information added to the image to retrieve the image onto a first recording medium, for generating address information of the image from retrieval information, and for forming a table including image information and the address information;

a code for retrieving a desired one of the images recorded on the first recording medium based on the address information in the table;

a code for converting the image retrieved into image data and recording onto a second recording medium; and a code for, when the image data is recorded, recording retrieval data associated with the address information corresponding to the image data onto the second recording medium.

6. A method according to claim 5, wherein the first recording medium is a microfilm.

* * * * *

UNITED STATES PATENT AND TRADEMARK OFFICE
CERTIFICATE OF CORRECTION

PATENT NO. : 6,532,313 B1
DATED : March 11, 2003
INVENTOR(S) : Masashi Yahara

It is certified that error appears in the above-identified patent and that said Letters Patent is hereby corrected as shown below:

Column 1,
Line 27, "large-number" should read -- large number --.

Column 12,
Line 13, "microfilm, F" should read -- microfilm F --.

Column 14,
Line 41, "corresponding-" should read -- corresponding --.

Signed and Sealed this

Eleventh Day of November, 2003

JAMES E. ROGAN
*Director of the United States Patent and Trademark Office*